(12) United States Patent
Bopardikar et al.

(10) Patent No.: US 6,615,342 B1
(45) Date of Patent: Sep. 2, 2003

(54) METHOD AND APPARATUS FOR OBJECT-ORIENTED INTERRUPT SYSTEM

(75) Inventors: Sunil K. Bopardikar, Sunnyvale, CA (US); Thomas Saulpaugh, San Jose, CA (US); Gregory K. Slaughter, Palo Alto, CA (US); Xiaoyan Zheng, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/536,237

(22) Filed: Mar. 27, 2000

Related U.S. Application Data

(63) Continuation of application No. 09/047,938, filed on Mar. 26, 1998, now Pat. No. 6,052,739.

(51) Int. Cl.[7] ............................... G06F 9/48; G06F 9/44
(52) U.S. Cl. ................. 712/227; 712/245; 712/219; 717/165; 717/121; 710/266; 710/268
(58) Field of Search ................. 712/245, 219, 712/23, 227; 710/266, 10, 268; 717/108, 116, 165, 121; 711/203, 206

(56) References Cited

U.S. PATENT DOCUMENTS

| | | | | |
|---|---|---|---|---|
| 5,379,431 A | * | 1/1995 | Lemon et al. | 710/10 |
| 5,423,043 A | | 6/1995 | Fitzpatrick et al. | 709/317 |
| 5,680,624 A | | 10/1997 | Ross | 710/261 |
| 6,308,247 B1 | * | 10/2001 | Ackerman et al. | 711/206 |

* cited by examiner

Primary Examiner—Daniel H. Pan
(74) Attorney, Agent, or Firm—Beyer Weaver & Thomas, LLP

(57) ABSTRACT

An object-oriented interrupt processing system in a computer system creates a system database including a device namespace containing an entry for each device in the computer system and an interrupt namespace containing an entry for each interrupt source, arranged as an Interrupt Source Tree. Each entry in the Interrupt Source Tree is cross-referenced to a corresponding entry in the namespace and contains a reference to an interrupt handler for the corresponding interrupt source. When an interrupt occurs, a single interrupt dispatcher is invoked, to access the Interrupt Source Tree and cause execution of the corresponding interrupt handler.

17 Claims, 13 Drawing Sheets

Today's Ethernet Read Interrupt Path

Future Ethernet Read Interrupt Path

METHOD AND APPARATUS FOR OBJECT-ORIENTED INTERRUPT SYSTEM

This is a continuation of application Ser. No 09/047,938 filed Mar. 26, 1998, now U.S. Pat. No. 6,052,739.

BACKGROUND OF THE INVENTION

1. Field of the Invention

The invention relates generally to apparatus and methods for providing interrupts in computer systems and, more particularly, to interrupt systems implemented in computer systems employing object-oriented software.

2. Description of the Related Art

Computer systems operate, in general, by executing a series of specific instructions contained in "programs" stored in memory. However, the computer must also respond to randomly occurring external and internal events called "interrupts", such as a user pressing a key on a keyboard or a printer signaling for more data to print. The computer must suspend normal processing and temporarily divert the flow of control from the stored program to another program called an "interrupt handler" routine.

Interrupt processing is performed by the operating system ("OS") software of both computers operating traditional software known as "procedural programming," and more recent systems employing software developed using object-oriented programing techniques. However, prior art object-oriented interrupt management systems have a number of limitations that affect both the portability and performance of the OS. That is, it would be desirable to provide an interrupt system to allow operating systems to be used with many different types of CPUs. Moreover, it would be desirable to provide increased speed and efficiency in handling interrupts by the operating system. The apparatus and methods of the present invention are designed to overcome all of these current limitations, providing with a portable and high performance interrupt management system.

SUMMARY OF THE INVENTION

Additional features and advantages of the invention will be set forth in the description which follows, and in part will be apparent from the description, or may be learned by practice of the invention. The objectives and other advantages of the invention will be realized and attained by the methods, apparatus, and articles of manufacture particularly pointed out in the written description and claims hereof, as well as the appended drawings.

To achieve these and other advantages, and in accordance with the purpose of the invention as embodied and broadly described, the invention provides a method for processing interrupts in an object-oriented computer system having a CPU, a memory containing a microkernel, a plurality of device constituting sources capable of generating interrupts, a plurality of drivers each associated with one of the sources, and a system database. The method comprises the steps of creating a device entry in the database for each of the devices, creating an interrupt source tree in the database comprising a plurality of source tree entries each comprising an object representing one of the sources, and implementing an interrupt registration interface comprising methods which install and remove interrupt management software components associated with each source in a corresponding source tree entry. The method further comprises the steps of cross-referencing each of the device entries with a corresponding one of the source tree entries, responding to an interrupt generated by a device by causing a single interrupt dispatcher to execute and identifying the device to the interrupt dispatcher; and processing the interrupt with a handler invoked by the interrupt dispatcher and corresponding to the identified device.

In another aspect, the invention includes apparatus for processing interrupts in an object-oriented computer system having a CPU, a plurality of devices constituting sources capable of generating interrupts, and a plurality of drivers each associated with one of the sources. The apparatus comprises a plurality of interrupt management software components supplied by the drivers each associated with an interrupt source; a memory containing a database having a device entry for each of the devices; an interrupt source tree comprising a plurality of interrupt source tree entries each comprising an object representing at least one of the sources and cross referenced to a corresponding device entry, each of the interrupt source tree entries including a reference to at least one of the interrupt management software components; and a single interrupt dispatcher for responding to an interrupt identified by the CPU by executing a corresponding interrupt management software component specified by an interrupt source tree entry corresponding to the identified device.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate one embodiment of the invention and, together with the description, serve to explain the principles of the invention.

DETAILED DESCRIPTION OF THE PREFERRED EMBODIMENTS

Figure 1:
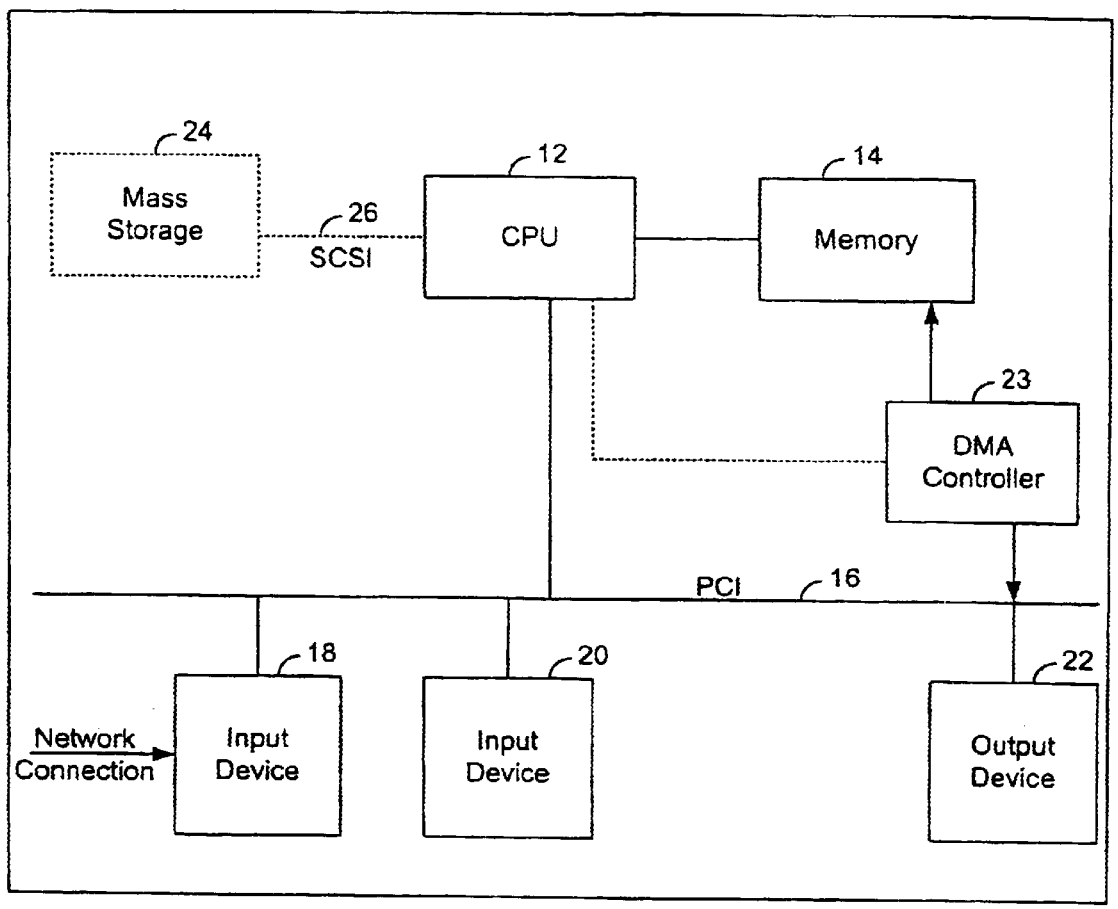
FIG. 1 is a hardware blocked diagram of a computer system embodying the present invention.

The invention is contained in an object-oriented operating system. The disclosed embodiment is implemented in the Java programming environment provided by Sun Microsystems, Inc. However, the invention is not so limited and may be incorporated into other computer systems, as is understood by those skilled in the art. Sun, Sun Microsystems, the Sun logo, Java, and Java-based trademarks are trademarks or registered trademarks of Sun Microsystems, Inc. in the U.S. and other countries.

Reference will now be made in detail to an implementation consistent with the present invention, as illustrated in the drawings. Wherever possible, the same reference numbers will be used throughout the drawings and the following description to refer to the same or like parts.

FIG. 1 shows a computer system 10 suitable for use with the present invention. Computer system 10 includes a central processing unit (CPU) 12 which may be, for example, a Sun SPARC, a Motorola Power PC or an Intel Pentium computer system 10 may represent a wide variety of computing devices. For example, system 10 may represent a standard personal computer, as widely used in homes and offices. Alternatively system 10 may comprise a much more specialized "smart" system, such as a set-top box for use in receiving high definition television, or a multi-function cellular telephone.

CPU 12 is connected to memory 14 which may include various types of memory such as random access memory (RAM) and read only memory (ROM). CPU 12 is also connected to an expansion bus 16 which may be, for example, a PCI bus. Various types of input and output devices 19, 20, and 22 are connected to bus 16. For example, input device 18 maybe a modem or network interface card connecting system 10 to a telephone line or local area network. Input device 20 may be, for example, a keyboard and output device 22 may be, for example, a printer. System 10 may optionally include a mass storage device 24, such as a hard disk drive connected by an I/O bus 26 which may be, for example, a SCSI bus. System 10 also includes a direct memory access (DMA) controller 23, under control of CPU 12, which can provide direct transfer of data between memory 14 and PCI bus 16.

Figure 2:
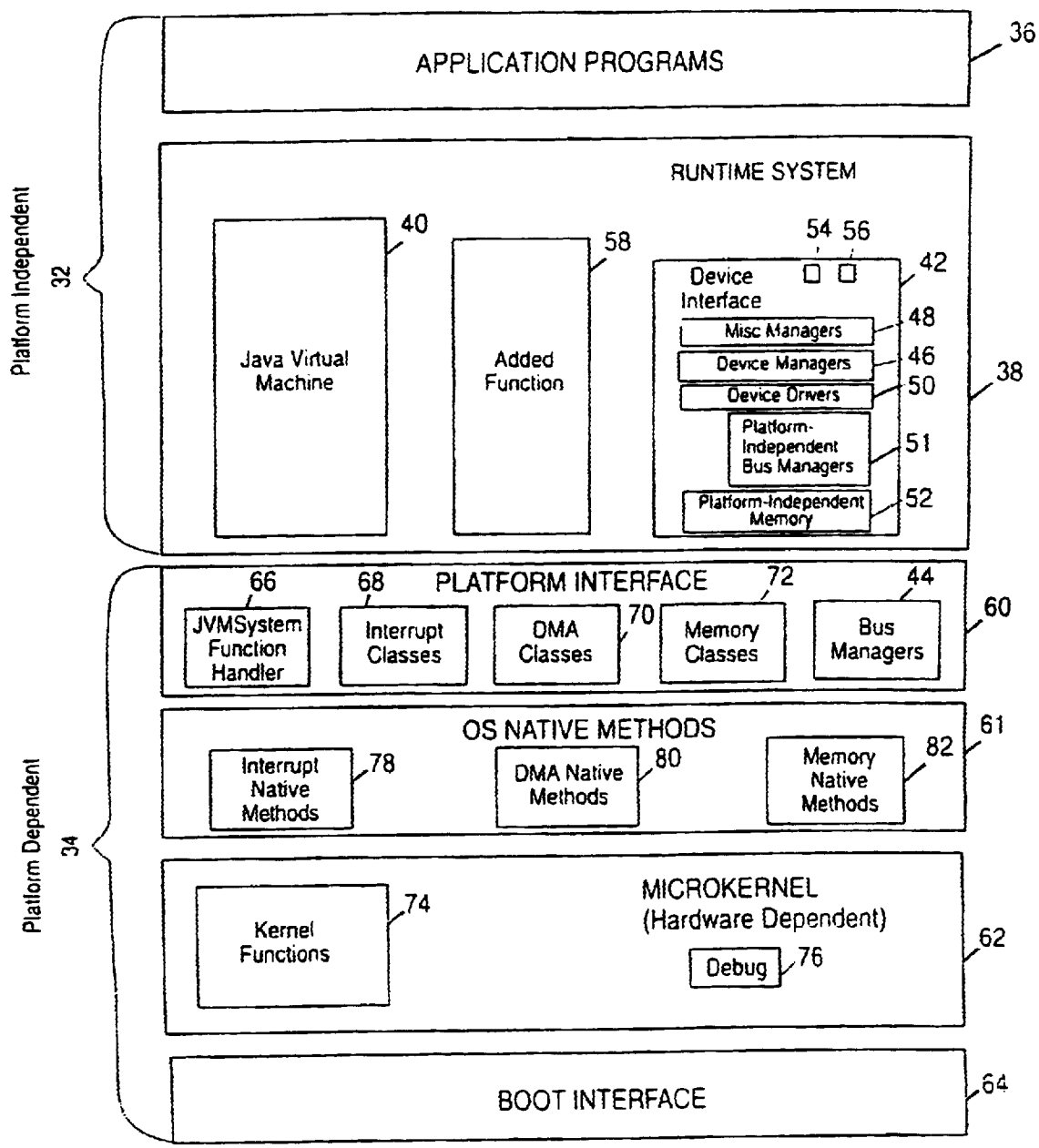
FIG. 2 is a diagram of object-oriented software of the computer system of FIG. 1.

Referring now to FIG. 2, there is shown a diagram of software stored in memory 14 of FIG. 1. FIG. 2 shows software logically arranged in a series of layers. An upper layer 32 is "platform-independent." The term "platform" generally refers to a CPU physical memory, and permanently attached devices and buses. Thus, the software contained in platform-independent layer 32 is written in a manner that it may be used with any platform, based on any CPU, either existing or to be developed in the future, without modification. A second layer 34 is platform-dependent. Thus, software of layer 34 must be customized for the particular platform of computer system 10.

Platform-independent layer 32 includes an application program layer 36 which performs specific operations for the user, such as desktop publishing, managing a telephone call, or database management. Application layer 36 interfaces with a runtime system 38 which includes a component known as a "Java™ Virtual Machine" (JVM). The JVM is a software component which receives instructions in the form of machine-independent byte codes produced by applications programs and interprets the byte codes. The JVM interfaces with a specific platform to execute desired functions. The disclosed embodiment employs a Java Virtual Machine, but other types of virtual machines are usable, as known to those skilled in the art. The operation of the JVM is well known to those skilled in the art and is discussed in, for example, the book *Java!* by Tim Ritchey, published by New Riders Publishing of Indianapolis, Ind., and *The Java Virtual Machine Specification* by Lindham and Yellin, Addison-Wellesley, 1997.

Runtime layer 38 also includes a device interface portion 42 which supports operation of devices such as buses 16 and 26 and devices 18, 20, 22 (FIG. 1). In particular, device interface 42 includes device managers 46 and miscellaneous managers 48. Device interface 42 also includes device drivers 50 which are object-oriented programs written for each of the devices 18, 20, and 22. Note that device drivers 50 are included in platform-independent layer 32, and thus, once written, may be used to support devices 18, 20, and 22 on any platform both existing and to be developed in the future. Similarly, device interface 42 includes platform-independent bus managers, 51 which are object-oriented programs written for buses, such as PCI bus 16 and SCSI bus 26 of FIG. 1. Device interface 42 includes memory classes 52.

Device interface 42 also includes a system loader 54 and a system database which support operation of computer system. System database 56 permits client software to store and retrieve configuration information on computer system 10. In particular, system database 56 contains configuration information for devices which are present, what system software services are installed, what user and group attributes have been selected, and any application-specific information required. In the described embodiment, the system database is referred to as a Java System Database (JSD). Additional details of the JSD are set forth in Appendix A in the microfiche.

Runtime system 38 includes additional functions 58 supporting operations such as input/output, network operations, graphics, printing, multimedia, etc.

Platform-dependent layer 34 includes a platform interface 60, an OS native layer 61, a microkernel 62, and a boot interface 64. Platform interface 60 includes virtual machine system function library handlers 66 which may be written in Java program language to provide support for system function calls received from virtual machine 40. Platform interface 60 further includes interrupt classes 68 also written in the Java programming language which support interrupt operations of computer system 10 and bus managers 44. Finally, platform interface 60 includes direct memory access (DMA) classes 70 and memory classes 72, each written in the Java programming language.

Microkernel 62 and OS Native Methods 61 consists of software components written in a language specific to CPU 12 ("native " language) which support essential low-level hardware functions of CPU 12, such as resource allocation, interrupt process, security, etc. In particular, microkernel 62 includes, a plurality of kernel functions 74 including thread management, exceptions, timing, physical memory management, hardware interrupt processing, platform control, process management, library management, I/O support, and monitor functions. These functions may be performed by the Chorus microkernel commercially available from Sun Microsystems. Microkernel 62 also include debug function 76. OS Native methods 61 consists of interrupt native methods 78, DMA native methods 80 and memory native methods 82.

The final component of platform-dependent layer 34 is boot interface 64. Boot interface 64 provides for loading and initialization of software into memory 14 (FIG. 1) when computer system 10 is initially powered up. Boot interface 64 may load software stored in, for example, a floppy disk, mass storage 24 (FIG. 1), or software received from a network via input device 18.

Next, a general description of a method for processing interrupts will be described. When the software for computer system 10 is loaded, boot interface 64 and bus managers 44 construct a system database. The system database includes a device namespace and an interrupt namespace. The device namespace is also created by boot interface 64 and bus managers 44 and contains entries in the form of objects for the CPU, for each bus, and for each device of computer system 10. The interrupts namespace contains an entry, in the form of an object, for each interrupt source, that is, each device or bus capable of generating an interrupt.

The objects of the interrupt namespace are organized in the form of an Interrupt Source Tree, wherein each object is an Interrupt Source Entry (ISE). Each entry of the device namespace is cross referenced with an ISE, that is, an entry in the interrupts namespace.

Each ISE includes a reference to one or more components of interrupt processing code. These components include interrupt handlers, interrupt enablers, interrupt disabler, and interrupt acknowledgers supplied by the device drivers.

When an interrupt occurs, the microkernel generates an interrupt vector identifying the device which caused the interrupt, causes an interrupt dispatcher to execute, and supplies the dispatcher with the interrupt vector. The interrupt dispatcher references device namespace of the system database and determines the entry therein corresponding to the device identified by the interrupt vector. The interrupt dispatcher then determines the ISE cross referenced to the identified device and determines the interrupt handler specified by the ISE to process the interrupt from the identified device. The interrupt dispatcher then causes the determined interrupt handler to execute.

The material below provides an overview of the interrupt classes and interfaces which form a part of the present invention and which implement the process described above. The first section describes how an interrupt source (i.e. a device, bus, or CPU) is abstractly represented and then published to drivers. The second overview section describes what kinds of code can be associated with a device that interrupts and how code is registered to handle and manage interrupts. The third overview section describes how interrupt handlers are coordinated and synchronized. The fourth overview section describes how interrupt handlers are dispatched in response to an interrupt.

Abstracting Interrupt Sources
Interrupt Source Objects

An interrupt is the means by which a device requests attention from software, such as a device driver. A device may be embedded within the CPU, attached directly to the CPU's external bus, or attached to another expansion bus such as PCI. The present invention represents any device that is capable of interrupting as an interrupt source.

Interrupt sources are related to other interrupt sources. For example, a device on the CPU's bus interrupts the CPU at some CPU-specific level. The CPU's interrupt level is a source of interrupt as is the device itself. When a device on a PCI bus generates an interrupt, the signal is propagated over one or more bus bridges until the CPU itself is interrupted.

The topology of interrupt routing and the device topology are similar, but not always identical. Because of the possible differences between device and interrupt topology, a separate class of object is required to represent an interrupt source.

Figure 3:
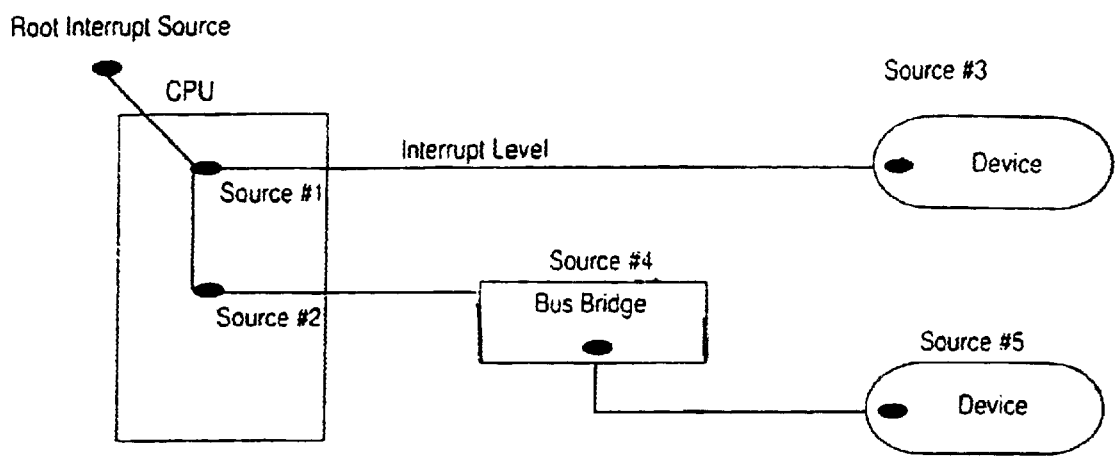
FIG. 3 is a diagram showing an example of the relationship between interrupt sources.

The present invention creates interrupt source objects to represent the CPU, each CPU interrupt level, and each bus-device combination using a level. FIG. 3 illustrates the concept of an interrupt source object for the CPU, each CPU-level (2 in this case), a bus interrupt source, and two device interrupt sources.

Interrupt Source Object Organization

The interrupt classes of the present invention manage the set of known interrupt sources. The set of active and possible interrupt source objects are organized in a hierarchical fashion within the JSD's interrupts namespace.

Interrupt Source Tree (IST)

The interrupts namespace (hereafter referred to as the Interrupt Source Tree (or IST) is pre-created in the Java System Database (JSD). Each JSD entry within the interrupt source tree represents a device capable of requesting attention via an interrupt. Each tier of the IST represents a finer and finer granularity of interrupt source from CPU (the tree root) to CPU-levels and buses (parent entries) and finally to devices (leaf entries).

Representing interrupt sources using a tree that is separate from the device tree has its advantages. Interrupt routing for example, doesn't always follow the device to bus connectivity. Some platforms require software to route and decode interrupt information, others have sophisticated hardware assist.

Designing device drivers and bus managers to handle all the various combinations of interrupt decode and dispatching logic is a nearly impossible task. The IST acts as a buffer, isolating and protecting portable device driver and bus manager software from the platform's interrupt hardware.

Each platform may require a differently shaped tree to convey the logic and flow of interrupt processing. The IST frees platform designers to use the latest and greatest interrupt controllers without fear that a driver will break. Device drivers never access interrupt controllers associated with a CPU (i.e. a PIC) or a bus bridge controller.

Figure 4:
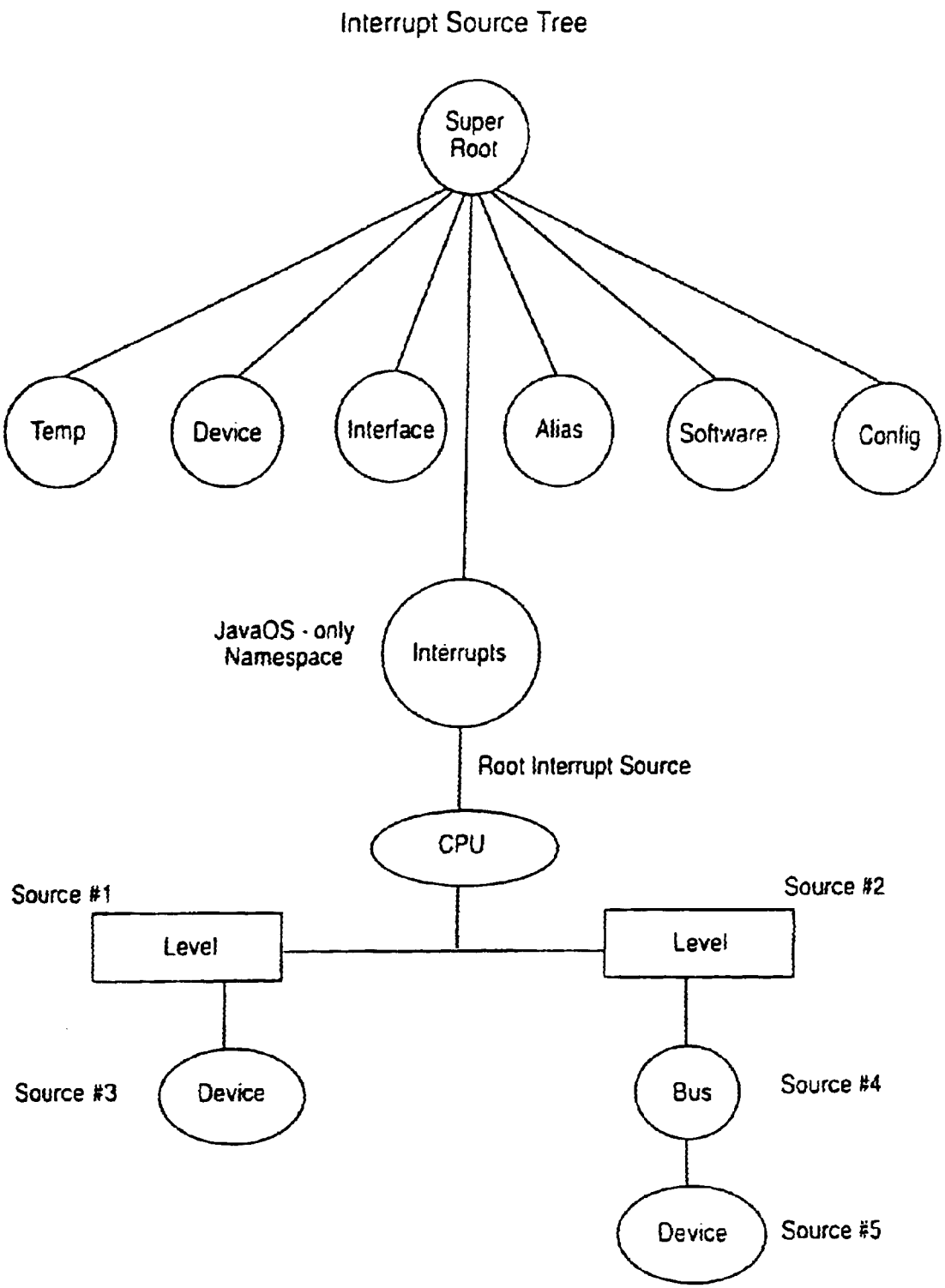
FIG. 4 is a diagram showing a portion of an interrupt source tree corresponding to the example of FIG. 3.

FIG. 4 shows how the previous example of related interrupt sources (See FIG. 3) is represented in the IST.

Interrupt Source Entries (ISE)

Each interrupt source is represented using a JSD entry called an Interrupt Source Entry (ISE). ISEs are Java objects that are accessed (sometimes concurrently) from both Java and native code.

An interrupt source entry sub-classes the JSD's base SystemEntry class.

```
import java.system.database.Entry;

public InterruptSourceEntry extends SystemEntry implements
    interruptRegistration ( . . . )
```

The ISE implements an interrupt registration interface consisting of methods that install and remove driver supplied code.

When creating an ISE to represent a bus, the maximum number of associated child (or device) ISEs must be specified. Pre-creating child "slots" has a number of advantages for the native code that must access an ISE at hardware interrupt level.

The first advantage for native code, is that all memory associated with the object can be easily locked down to prevent page faults. Most microkernels cannot support handling page faults at interrupt level.

Secondly, a bus ISE can store references to device ISEs in a pre-created array instead of using the SystemEntry's linked-list approach. Using an array within an ISE, allows bus managers to number the child devices and use that number as an array index. This is especially important at hardware interrupt level. Indexing into an array using JNI is much simpler than running a linked-list.

Figure 5:
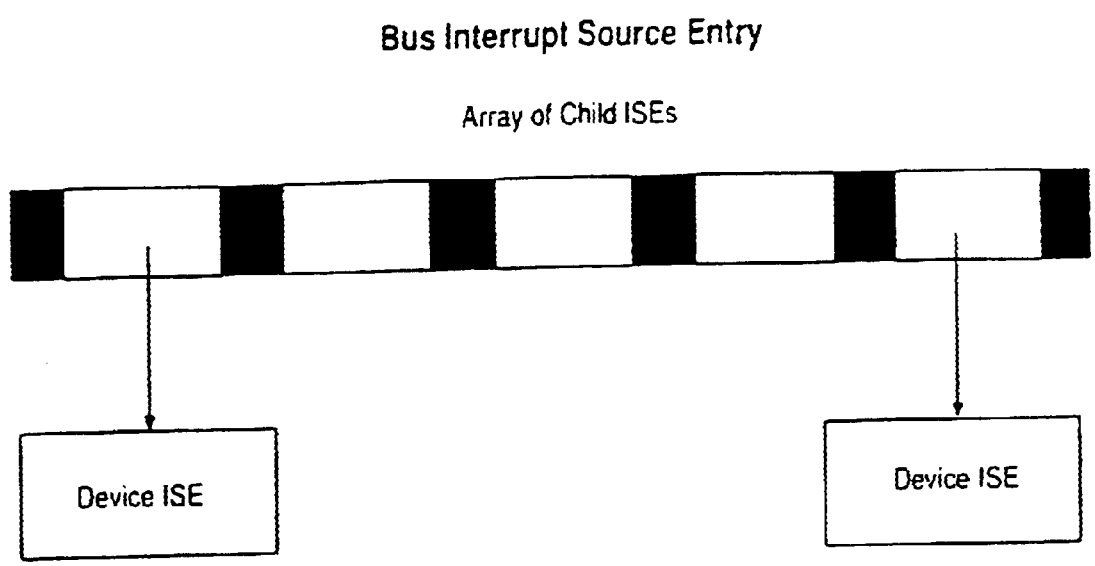
FIG. 5 is an example of a bus interrupt source entry.

FIG. 5 illustrates a bus ISE's array of child ISEs.

IST Construction

The IST is built dynamically as JavaOS initializes the platform. First, the platform manager creates the interrupts namespace root, and installs itself as the manager of this namespace. (See JSD spec regarding. namespace managers) Next, the platform manager creates a single root CPU Interrupt Source Entry (ISE), and then proceeds to create a child ISE for each CPU interrupt level (capable of interrupt on this platform).

Device and Interrupt Namespace Coordination

Figure 6:
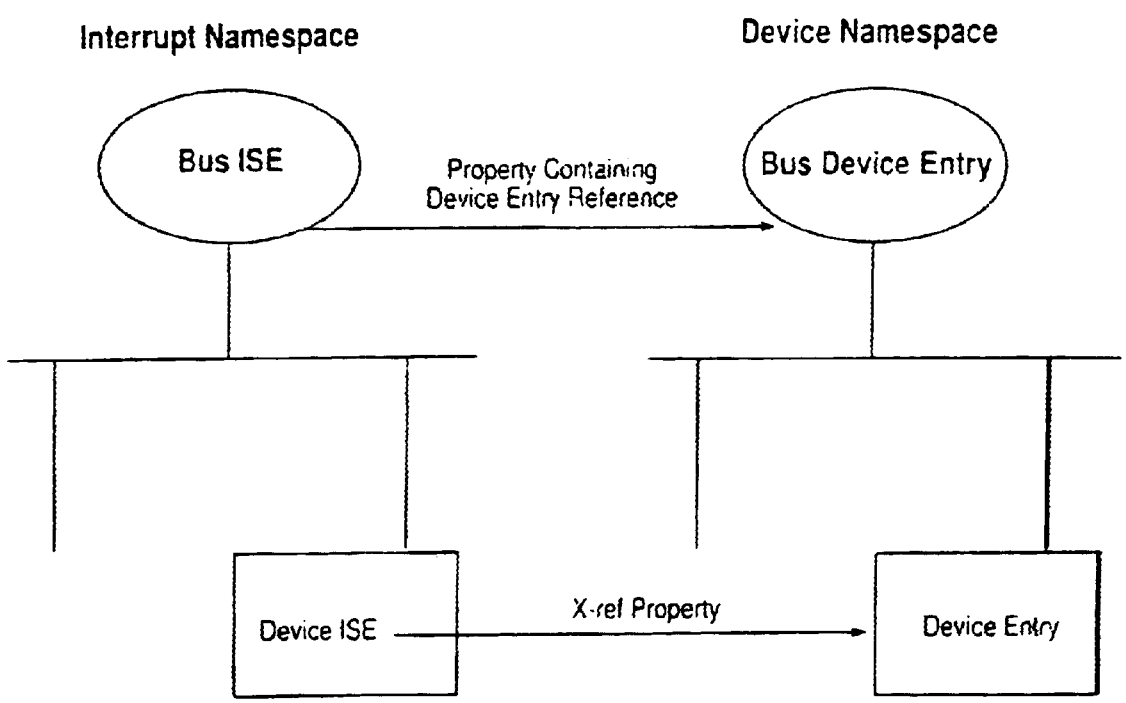
FIG. 6 is a diagram showing interrupt and device namespace cross-referencing.

As the device manager matches devices with drivers and buses with bus managers, the tree grows and handlers are installed. The platform manager and each bus manager that is activated grows the tree by adding child interrupt source entries. Each new child ISE is cross-referenced with a device entry in the device namespace, using a JSD property. FIG. 6 illustrates how the device and interrupt namespaces are cross-referenced.

IST Topology and Management

The Platform Manager, each bus manager, and each driver interact with ISEs and the IST in some manner.

Platform Manager Creates CPU and CPU-levels

The Platform Manager creates the interrupts namespace, and then creates a single CPU object and multiple CPU-level objects. Each JavaOS platform comes with built-in handlers (native and Java) for each CPU-level.

Bus Managers Grow and Shrink the IST

Bus managers, including the platform's CPU bus manager (i.e. Platform Manager) maintain the IST on behalf of drivers and other bus managers. For each device under the control of a bus manager, at least one entry in the IST is created to represent that device's interrupt source.

Device Drivers Use Entries in the ISE

Figure 7:
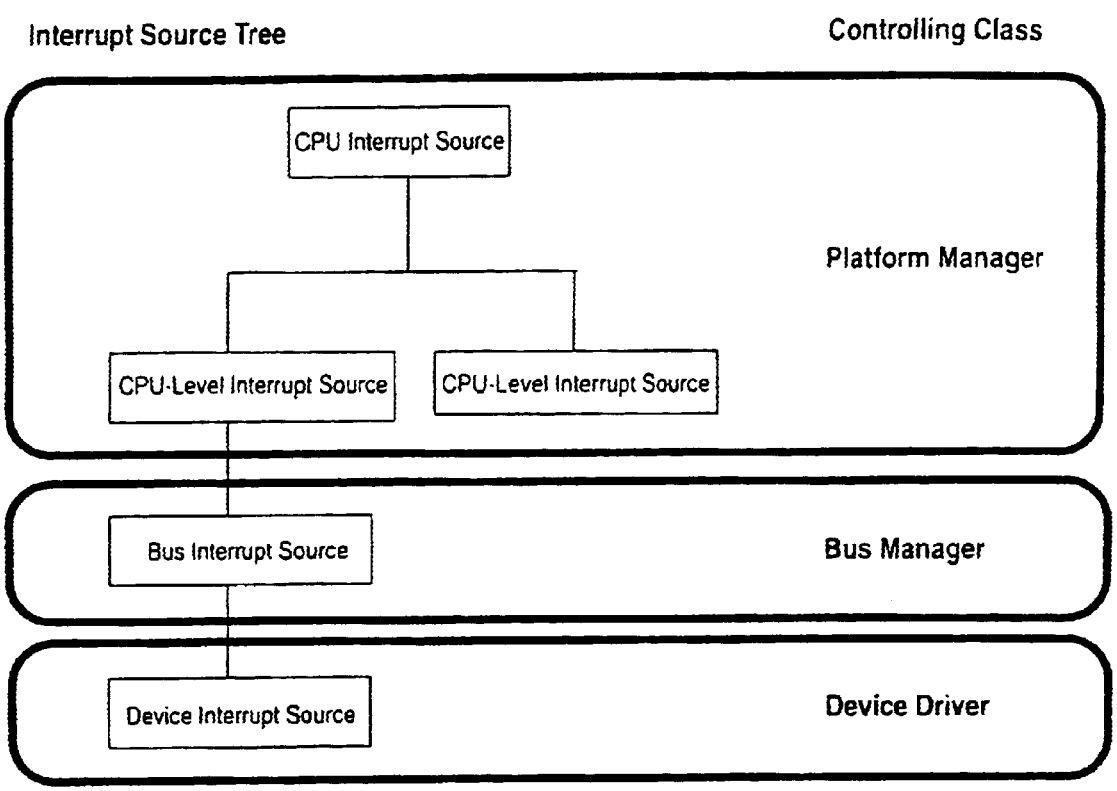
FIG. 7 is a diagram illustrating the relationship between software and various levels of the interrupt source tree.

Drivers construct interrupt source objects and then ask the appropriate bus manager to install it in the IST FIG. 7 illustrates what code manages which levels of the IST.

Interrupt Code Registration

This second overview section describes how code is registered to handle and manage interrupts.

Interrupt Code Types

Four kinds of code can be registered with an interrupt source entry: interrupt handlers, interrupt enablers, interrupt disablers, and interrupt acknowledgers.

An interrupt handler executes in response to an interrupt. Its job is to satisfy the device's request for attention, secure any realtime data, and return control to the operating system as soon as possible. The present invention provides three types of interrupt handlers, as set forth below.

An interrupt enabler places the device in a state where interrupts are possible or un-masked. A CPU interrupt enabler enables all interrupts sharing the CPU interrupt controller (internal or external). A CPU-level enabler un-masks just a single level of interrupt. A bus or device enabler un-masks just those interrupts from the bus or device.

An interrupt disabler places the device in a state where interrupts are impossible or masked.

An interrupt acknowledger communicates to hardware the fact that the OS and/or device driver has handled (or acknowledged) the interrupt. Acknowledgment can take place before or after a handler is actually dispatched.

Interrupt Handlers

The present invention recognizes three levels of interrupt processing, each level defining a handler and an execution context for that kind of handler. The microkernel oversees two of the three levels of interrupt processing. The third (Java-centric) level of interrupt processing is supported by the Java Virtual Machine using Java threads.

Each kind of handler associated with an interrupt processing level runs in its own special interrupt execution context. A single interrupt source can have none, any, or all of these handler kinds assigned to process interrupts working as a team of handlers.

Each level of interrupt processing can communicate state and data to any other level using the interrupt source entry as a common data exchange point. Two of these interrupt processing levels are deferred. A deferred interrupt level is desirable for non-realtime processing, and is triggered from native code only.

The three kinds of interrupt processing are:

First-level realtime native interrupt processing

Second-level deferred native interrupt processing

Third-level deferred Java interrupt processing

First Level Handler

The first kind of interrupt handler is a native interrupt handler that executes at CPU interrupt level. This handler is composed of native code that may or may not have been compiled from 'C'. This handler does obey 'C' calling conventions defined for the processor, even if the handler is composed of assembly language.

Upon entry to the first-level handler, the microkernel has already saved processor registers and may have switched to a separate interrupt stack. The choice of which stack to run first-level handlers on is up-to the microkernel.

Many microkernels will dedicate an interrupt stack per-CPU for this purpose. Others will just execute the handler on the stack of the current thread, unwinding the stack upon the completion of the handler's processing.

The code in this kind of handler runs when invoked by the microkernel. Interrupt level execution context provides the following support services to the first-level handler. A first-level interrupt handler can use JNI (Java Native Interface) to:

Read and write data within the interrupt source object.

Traverse the IST and subsequently dispatch other first-level interrupt handlers.

Signal the object, so that waiting threads at second, third, or main execution levels run.

A first-level handler's job is to satisfy the immediate real-time needs of a device such as reading data from a device with limited buffering capability.

After satisfying the realtime needs of a device, a first-level interrupt handler can cause a second or third-level handler to be queued by the microkernel. A first-level handler can choose to pass state and/or data to deferred second and third level handlers through the interrupt source object using JNI to get and set data within the object.

The handler's 'C' function prototype matches that of an interrupt source object's native method prototype with a single long parameter that contains the current time since boot in microseconds. The handler returns an integer that signals whether or not the interrupt was processed by the handler. A native CPU-level interrupt handler is defined thusly:

```
typedef long firstLevelHandler(void *ise, int64_t when);
```

Multiple first-level interrupt handlers can be executing simultaneously, each at a different level. This is true in single CPU and also in a SMP system. In a SMP system however, the microkernel serializes the execution of each interrupt level so that 2 CPUs don't attempt to execute the same handler simultaneously.

First-level interrupt handlers are the highest priority code in the system, preempting other interrupt handlers and threads. Consequently, the time spent in a first-level interrupt handler should be kept to a minimum.

Second Level Handler

The second kind of interrupt handler runs in the context of a native interrupt thread. This handler is also composed of native code that obeys 'C' calling conventions, and is structured as a native method with a single parameter.

Like a first-level handler, a second-level handler has a limited number of support services at its disposal. Native handlers (first and second levels) may only use JNI to get and set ISE data and to invoke other native methods associated with the same ISE.

A second level interrupt handler is queued to run under two circumstances. A first-level interrupt handler can queue a second-level handler, or if no first-level handler exists, the microkernel will, automatically queue the second-level handler in response to an interrupt;

A native second-level interrupt handler is defined thusly:

typedef long secondLevelHandler(void*ise, int64_t when);

The native interrupt thread is created by the microkernel during the second-level handler registration process. The stack allocated for a native thread is at least a page in length.

Second-level interrupt handlers run after first-level interrupt handlers, and may preempt third-level handlers and other Java or native threads.

Third Level Handler

A Java interrupt handler runs in the context of a Java thread and therefore may use the full resources of the language, JavaOS, and JDK.

The Java interrupt handler can run in the context of any Java thread, including a pre-created Java system thread.

A third-level interrupt handler is queued to run under the following circumstances. If no first or second level handler exists for an interrupt source, the microkernel queues the third-level handler when the device interrupts.

A third-level interrupt handler can also run if queued by either a first or second level handler. Third-level interrupt handlers run after first and second-level interrupt handlers, and may preempt other low-priority threads.

A third-level Java based interrupt handler method in the DeviceInterruptSource class is defined as below and is over-ridden by the derived specific device driver classes to do some useful work.

public boolean handleThirdLevelInterrupt(long when)
        return true;
    }

Interfaces for Interrupt Code

Handlers, enablers, disablers, and acknowledgers must be registered with an interrupt source object before being recognized by JavaOS. When a new entry is added to the IST, the ISE inherits its parent's registered code. Later, code specific to the child is registered.

Java interfaces are defined for each kind of interrupt management code.

Interrupt Handler Interfaces public interface DeviceInterruptManager extends
    InterruptManagement {
        public boolean setFirstLevelIntrHandler (int
    firstLevelIntrHandler);
        public boolean setSecondLevelIntrHandler (int
    secondLevelIntrHandler);
        public boolean handleThirdLevelInterrupt (long
            when);
        . . .
    }

The DeviceInterruptSource class implements the DeviceInterruptManager interface. The setFirstLevelIntrHandler method of this interface takes an integer parameter which is used to set an integer variable meant for storing the 'C' address of the native first level interrupt handler. A child class of DeviceInterruptSource that needs a first level handler should call it's native method to fetch the address of the first level interrupt handler. Next it should call the setFirstLevelIntrHandler method to store this value into the ISE. Once this ISE is inserted into the IST, the CpuLevelInterruptSource class methods can invoke the first level interrupt handler for this device using the 'C' function pointer stored in the ISE.

The second level interrupt handlers are handled similar to the first level interrupt handlers.

The third level Java based Interrupt handler, handleThirdLevelInterrupt has a dummy implementation in the DeviceInterruptSource class that is overridden in the child classes.

Interrupt Management Interfaces public interface InterruptEnabler ( . . . )
    public interface InterruptDisabler ( . . . )
    public interface InterruptAcknowledger ( . . . )

Interrupt Level Management

First-level interrupt handlers are necessary when a device may lose data if not attended to in a timely fashion. The duration of a first-level interrupt handier should be measured in microseconds.

Second-level interrupt handlers are useful when doing extended realtime processing such as is necessary with multi-media applications.

Third-level interrupt handlers are useful when doing non-realtime processing such as mouse and keyboard event handling. Third-level interrupt handlers may experience sporadic latencies due to the necessity to synchronize with the virtual machine's garbage collector. If these latencies are unacceptable to the management of a device, a second-level interrupt handler should be used.

It is the job of the driver to choose when to use each level of interrupt processing. The present invention greatly simplifies the job of synchronizing multiple levels of interrupt processing.

Synchronizing Interrupt Handlers

With interrupt handling comes the problem of synchronization. The present invention allows a driver's non-interrupt level code to synchronize with all three levels of interrupt processing. We examine second and third-level handler synchronization first.

Each thread that executes second and third level handlers acquires the Java monitor associated with the ISE before executing the handler. A driver can thus prevent a second or third-level handler from running by just acquiring the ISE's monitor. If an interrupt handler was already running the driver will block until the handler releases the monitor. If the monitor was free, the driver will acquire the monitor and block any subsequent monitor acquisition attempt by a handler, until the driver releases the monitor.

Synchronizing with code not executing within a thread context (i.e. first-level handlers) requires the driver to enable and disable the interrupt source itself. Each interrupt source object implements an interface containing enable and disable methods for this purpose.

Figure 8:
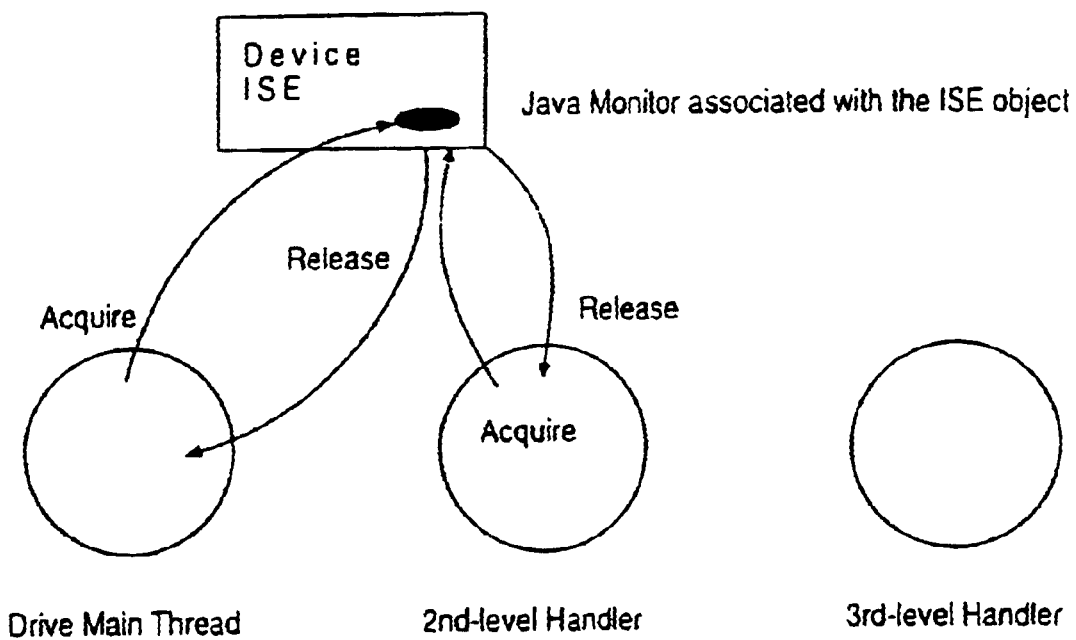
FIG. 8 is a diagram illustrating interrupt handler synchronization.

FIG. 8 illustrates the use of Java monitors in interrupt processing.

Queuing a Deferred Interrupt Handler

Native first-level and second-level interrupt handlers can choose to defer work to higher interrupt levels on a per-interrupt basis. A simple mechanism is required to allow drivers to defer work.

To defer work from a lower interrupt-level to a higher-interrupt level, an interrupt handler merely notes the current interrupt source object. Notifying the interrupt source object, causes the virtual machine to wake-up threads waiting on the interrupt.

For example, a third level interrupt handler can run in the context of a precreated Java System Thread or in the context of any other thread. The waiting thread maintains a loop something like:

```
public void run {
    while (true) {
        try {
            long when =waitForNextInterrupt( );
            handleThirdLevelInterrupt (when);
        } catch (Throwable e) {
        }
}
```

Figure 9:
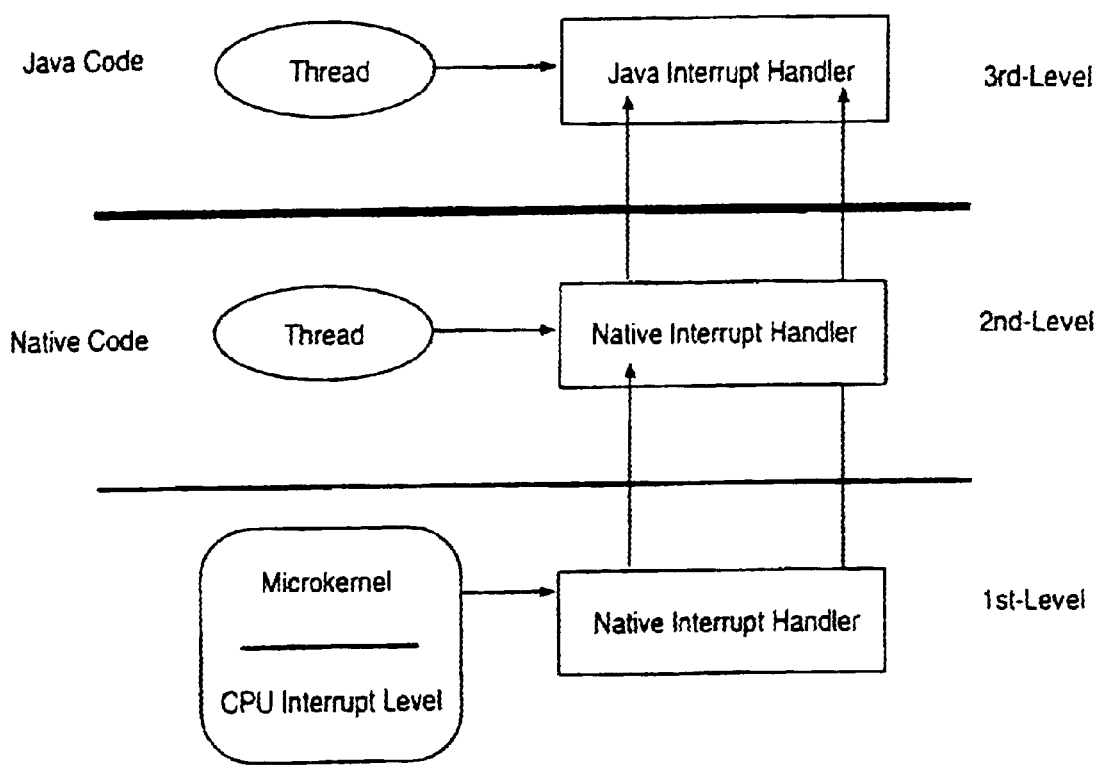
FIG. 9 is a diagram illustrating the concept of deferred interrupt handling.

FIG. 9 illustrates the concept of deferred Interrupt handling:

Interrupt Dispatching

This section of the document describes the processing of interrupts, using three levels of handlers.

Dispatching an interrupt handler requires access to the IST. The IST is made accessible to the native methods of the JavaOS CpuLevelInterruptSource class during platform initialization.

The native portion of the interrupt class makes sure that each entry in the tree (a Java object) is locked down in the Java heap for the duration of its lifetime. A pointer to the ISE representing the CPU is stored in a static variable for safekeeping and access by the native interrupt dispatcher when called upon to handle an interrupt.

Interrupt Dispatcher

Figure 10:
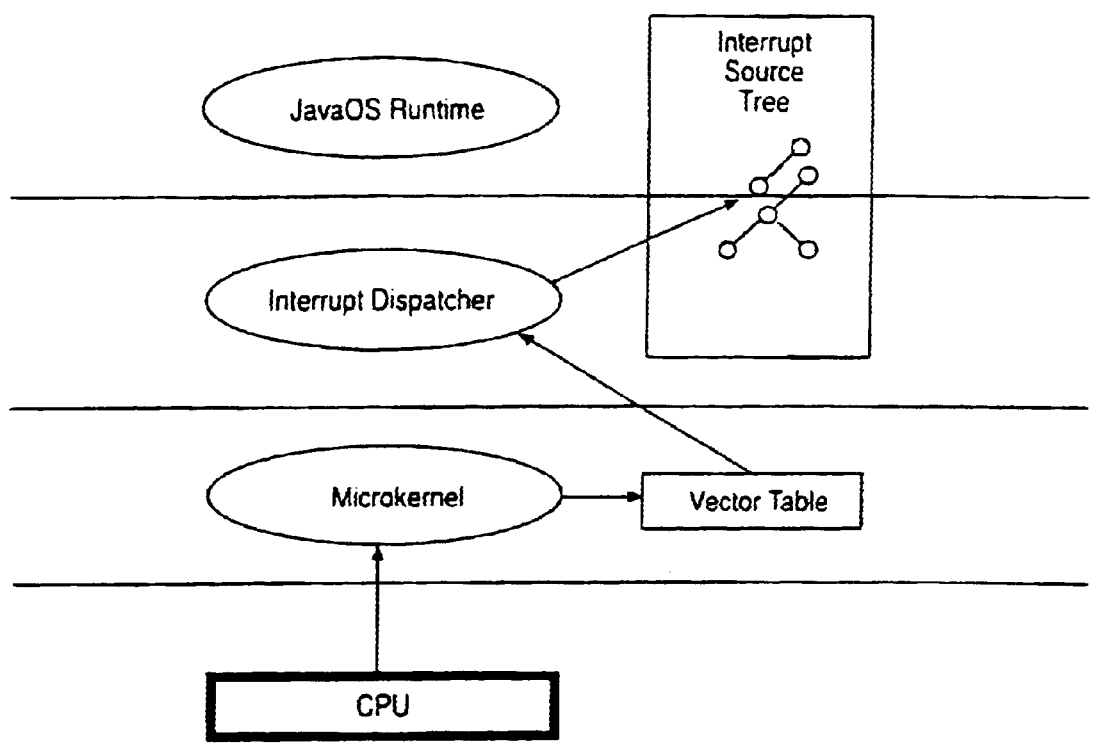
FIG. 10 is a diagram showing an interrupt dispatcher and its relationship to run time and microkernel software.

The JavaOS interrupt dispatcher is a component of native code that executes first and second-level interrupt handlers. The interrupt dispatcher is layered upon the microkernel, and actually registers itself as a handler of all interrupt vectors that the microkernel exports. FIG. 10 shows the interrupt dispatcher layered upon the microkernel.

The microkernel has no knowledge of the IST. The interrupt dispatcher presents itself to the microkernel as the sole handler of all interrupts. This design asks little of an underlying microkernel besides a simple interface to install and remove CPU vector interrupt handlers.

The following 'C' interface supports the interrupt dispatcher:

void (*native_handler) (int level);
void set_native_intr_handler (int level, native_handler func);

The "level" parameter designates a CPU level (or vector). The "func" parameter designates a native interrupt handler. Passing in a null handler removes the handler. The microkernel passes the current interrupt level to the native handler as the sole parameter.

Bus and Device Interrupt Handling

Each bus and device has an associated interrupt handler. Bus interrupt handlers perform a special decoding function that actually augments the handler invocation logic used by the interrupt dispatcher.

A bus handler's job is to determine which device interrupt handler should be invoked next. The device interrupt handler is invoked by the bus interrupt handler using JNI. In the case of layered buses, multiple bus interrupt handlers may be invoked to decode an interrupt. Eventually a device handler will be invoked that actually processes the device's interrupt.

Bus and device interrupt handlers can exist at all levels of interrupt processing depending upon platform requirements and performance considerations. The process is always the same however. Bus interrupt handlers determine the source of the interrupt on a particular bus. Device interrupt handlers process the interrupt. The only difference at each level is the execution context: interrupt or thread, native or Java.

Figure 11:
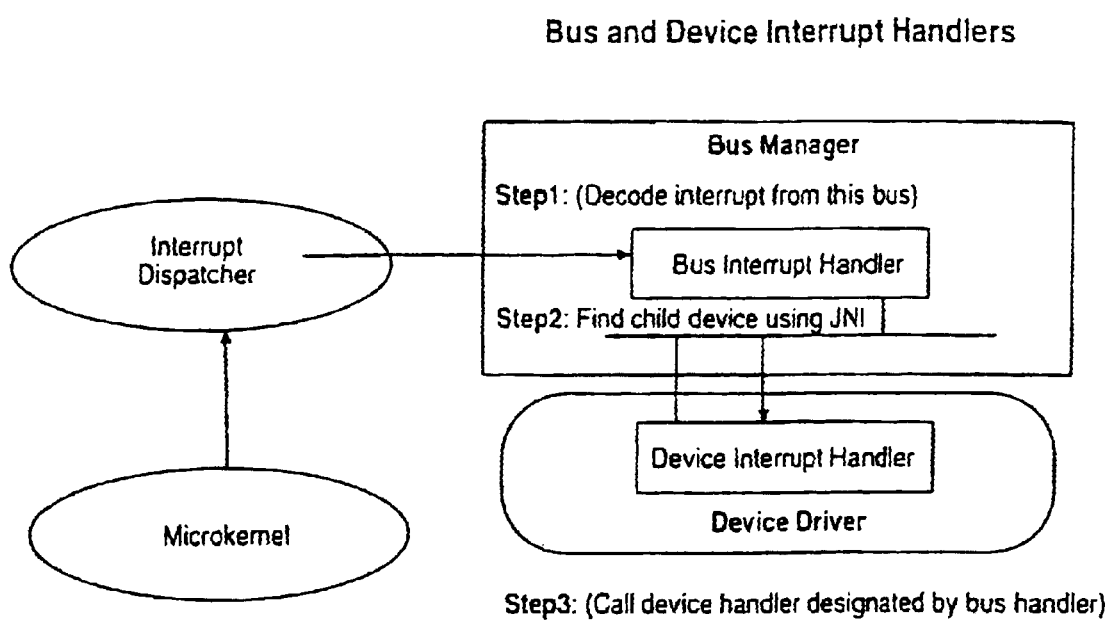
FIG. 11 is a diagram showing bus add device interrupt handlers.
Figure 12:
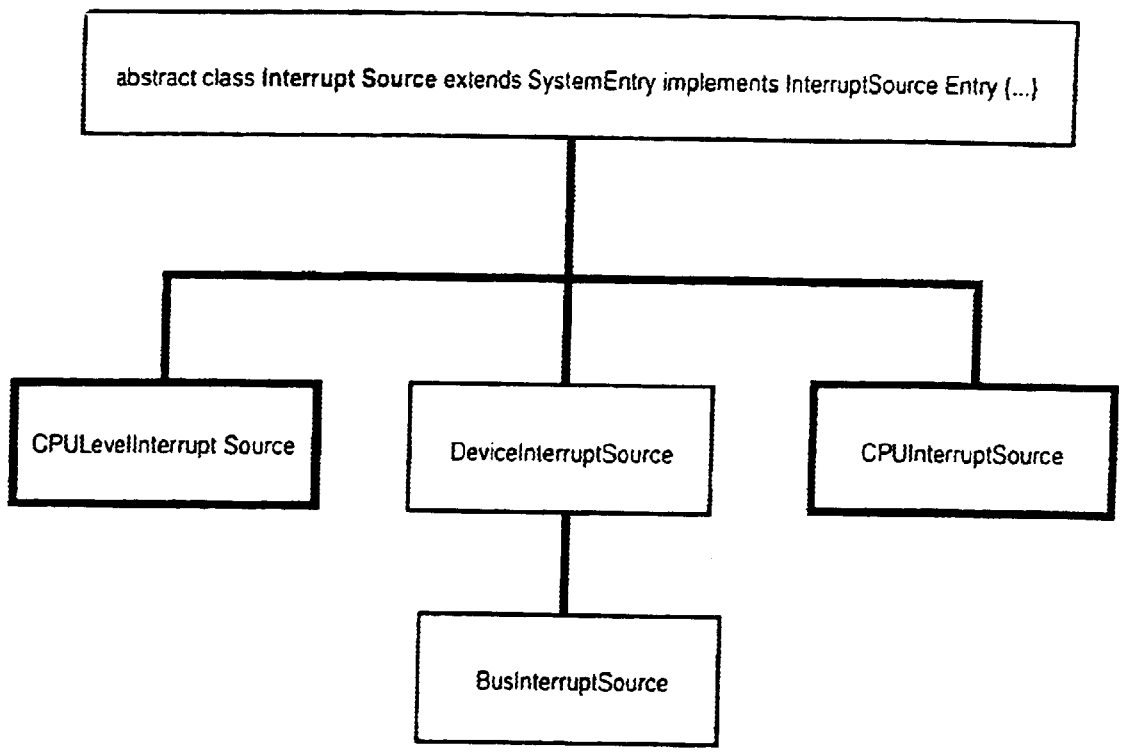
FIG. 12 is a diagram showing interrupt source class hierarchy.

FIG. 11 illustrates bus and device interrupt handlers.
FIG. 12 illustrates the InterruptSource class hierarchy.

Performance Improvements

The present invention enables Java-level threads to directly process interrupts just by waiting on an InterruptSource object. This programming model eliminates the need to switch to a specially designated Java-level System Thread to invoke a handler.

Figure 13:
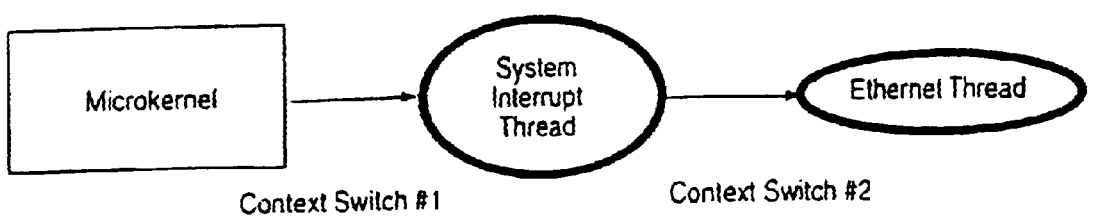
FIG. 13 is a diagram illustrating improvements in performance by the present invention of an Ethernet read interrupt operation.
Figure 13:
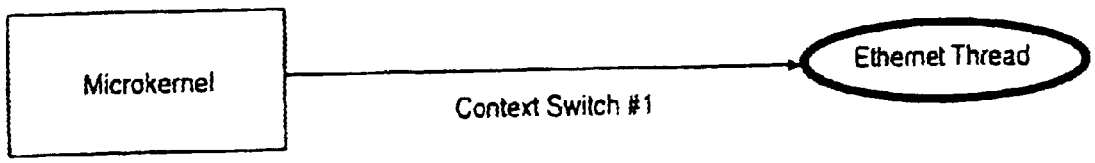

For example, prior art networking drivers install an interrupt handler that wakes-up a "reader" thread within the driver. The present invention allows the "reader" thread to directly wait for the interrupt instead of relying on the special system interrupt thread to run. FIG. 13 shows performance improvement for an Ethernet Read interrupt.

The following section describes in greater detail the classes and interfaces of the present invention.

Class and Interface Summary
Public Interface InterruptSourceEntry Extends Entry

| Method or Constructor | Function |
| --- | --- |
| public boolean isEnabled( ). | Is this interrupt source enabled? |
| | interface InterruptHandlers extends FirstLevelInterruptHandler, SecondLevelInterruptHandler, ThirdLevelInterruptHandler |
| a collection of handler interfaces | CpuLevel and Bus interrupt sources declare implementations for all of these handlers. Not supplying native code is ok as long as the system doesn't try to invoke the methods. If this happens, a NativeMethodNotFoundException is thrown. Default "null" first and second level handlers are supplied to prevent this condition. |
| public boolean insert(Entry child); | Override JSD's insert method Scan array of children looking for an available slot. If no slot is found, fail the insert. Ask JSD (call super.insert(child)) to place entry in JSD. If that fails, return error. Insert child into parent's array of children. Call native method initChild( ) to perform any native-side initialization including JNI calls to find other native methods. |
| public boolean isEnabled( ); | Is this interrupt source enabled? |
| public boolean isSrcEnabled = false; | boolean containing current state of this interrupt source |
| | abstract class InterruptSource extends SystemEntry implements InterruptSourceEntry |
| InterruptSource (InterruptSource parent, String name, int maxChildSources); | Construct an InterruptSource. Insert this source under 'parent' in the JSD. If this interrupt source will be a parent of future interrupt sources, supply the maximum number of child slots. The constructor uses 'maxChildSources' to allocate an array of InterruptSources. Insert this child into parent's child array. Array access to children is an |

-continued

| Method or Constructor | Function |
|---|---|
| | optimization, so we don't have to use JSD cursors to walk the list of child interrupt sources. The Platform Manager creates CPU and CPULevel Interrupt Source objects that use this constructor. Last thing constructor does is call the native init( ) method to perform native-side initialization. For example, pin interrupt source in heap so native side can safely operate at interrupt level. |
| InterruptSource (String name, int maxChildSources); | Same as above, except do not insert into JSD or parent's child array. It is expected that bus managers and device drivers will use this constructor. The bus manager will then insert entry into JSD. |
| public void inheritFromParent(InterruptSource child); | Copy interrupt management routines (enabler, disabler, and acker) from parent to child. Bus Managers can use this feature to pass-on default management routines to child and consequently to grand-children. (i.e. layered bus managers) |
| public boolean insert(Entry child); | Override JSD's Insert method. Scan array of children looking for an available slot. If no slot is found, fail the insert. Ask JSD (call super.insert (child)) to place entry in JSD. If that fails, return error. Insert child into parent's array of children. Call native method InitChild( ) to perform any native-side Initialization including JNI calls to find other native methods. |
| public boolean isEnabled( ); private boolean isSrcEnabled = false; | Is this interrupt source enabled? boolean containing current state of this Interrupt source | public class CpuInterruptSource extends InterruptSource implements

| public CpuInterruptSource(int nLevels); | Construct CpuInterruptSource object. The name is same as cpu's name in device tree. Also add a x-ref property called "device" that points to the cpu entry in the device tree. nLevels is passed as 'maxChildSources' to the InterruptSource constructor. |
| public native int getCpuInterruptLevelCount( ); | Return integer count of the number of interrupt levels supported by this cpu. Called by PlatformManager and result is passed into CpuInterruptSource constructor. |
| private native boolean initCpu( ); | Perform one-time cpu interrupt management initialization. (Cpu and Platform dependent) Called by constructor. |
| public native boolean enableInterrupt( ) | Enables cpu interrupts (all levels) |
| public native boolean disableInterrupt( ) | Disables cpu interrupts (all levels) |
| public native void acknowledgeInterrupt( ) | Acks a cpu interrupt - May use Internal or external interrupt controller. (Platform/CPU specific) May do nothing at all. |

InterruptManagement
public class CpuLevelInterruptSource extends InterruptSource

| public CpuLevelInterruptSource (CpuInterruptSource cpu, int level, int maxChildrenSharingLevel); | Construct a CpuLevelInterruptSource object to represent this cpu's interrupt level # 'level' Name of this entry becomes "cpu.getName( )+ Level" + level. Store level |

-continued

| Method or Constructor | Function |
|---|---|
| | as integer within object so native code as access. Platform supplies maximum number of child devices capable of sharing this interrupt level simultaneously |
| public int getLevel0; | Return interrupt level associated with this source. |
| private native boolean initCpuLevel( ) | One-time initialization of a cpu's interrupt level. CPU and Platform specific. May do nothing. Called by constructor. |
| private int levelNumber; | contains interrupt level from constructor. |
| public static native int maxDevicesForLevel(int level); | Platform native method returns maximum number of devices that can share this interrupt level at the same time. Result Is used by PlatformManager as a parameter to the constructor. |
| public boolean handleThirdLevelInterrupt(long when); | Third-level interrupt handler for this level. Called by System Interrupt Thread in response to an interrupt at this level. This third level handler calls third-level handlers of all children. |
| public native boolean handleSecondLevelInterrupt(long when); | Second-level interrupt handler for this level. Called by native System Interrupt Thread. |
| public native boolean handleFirstLevelInterrupt(long when); | First-level interrupt handler for this level. |
| public native boolean enableInterrupt( ); | Enables cpu-level interrupts by un-masking this level in the CPU's or platform's interrupt controller. |
| public native boolean disableInterrupt( ); | Disables cpu-level interrupts by masking this level in the CPU's or platform's interrupt controller. |
| public native void acknowledgeInterrupt( ); | Acks a cpu-level interrupt. CPU or Interrupt Controller specific operation. | implements InterruptManagement, InterruptHandlers
public class DeviceInterruptSource extendsInterruptSource

| public DeviceInterruptSource (String deviceName); | Construct a DeviceInterruptSource for the specified named device. Name is obtained from Bus Manager upon driver start-up. Also add a x-ref property called "device" that points to the device entry in the device tree. |
| public DeviceInterruptSource (String deviceName, int maxChildren); | BusInterruptSource constructor calls this constructor. |
| public boolean handleThirdLevelInterrupt(long when); | Third-level interrupt handler for this device. Sub-classes override this dummy method. |
| protected int firstLevelIntrHandler; | This is set to the address of the native first level Interrupt Handler function using the setFirstLevelIntrHandler method. |
| protected int secondLevelIntrHandler; | This is set to the address of the native second level Interrupt Handler function using the setSecondLevelIntrHandler method. | implements DeviceInterruptManager, Runnable
public abstract class BusInterruptSource extends DeviceInterruptSource implements InterruptManagement

| BusInterruptSource (Entry bus, int maxSources); | Construct a BusInterruptSource for the specified bus. Also add a x-ref property called "device" that points to the device entry in the device tree. The 'maxSources' integer defines the maximum number of child device interrupt sources that this bus handles. Using this integer, the constructor creates an |

-continued

| Method or Constructor | Function |
|---|---|
| | array of InterruptSources. |
| public abstract boolean enableInterrupt( ); | force sub-class to implement a bus-specific interrupt enabler method. May just inherit parent's enabler. |
| public abstract boolean disableInterrupt( ); | force sub-class to implement a bus-specific interrupt disabler method. May just inherit parent's disabler. |
| public abstract boolean acknowledgeInterrupt ( ); | force sub-class to implement a bus specific interrupt acknowledgment method. May just inherit parent's acker. |
| public interface FirstLevelInterruptHandler | |
| public boolean handleFirstLevelInterrupt(long when); | Prototype for a native first-level interrupt handler. Handler is passed 2 parameters. The first parameter is the usual handle to the object. The second is a time-stamp in microseconds. |
| public interface SecondLevelInterruptHandler | |
| public boolean handleFirstLevelInterrupt(long when); | Prototype for a native first-level interrupt handler. Handler is passed 2 parameters. The first parameter is the usual handle to the object. The second is a time-stamp in microseconds. |
| public interface InterruptEnabler | |
| public boolean enableInterrupt( ); | Returns true if interrupt was already enabled, otherwise false. Enables interrupts from this source. |
| public interface InterruptDisabler | |
| public boolean disableInterrupt( ); | Returns true if interrupt was already enabled, otherwise false. Disables interrupts from this source. |
| public interface InterruptAcknowledger | |
| public void acknowledgeInterrupt( ); | Ack source of interrupt before and/or after we have handled interrupt. Choice of before or after is device and hardware dependent. |

The classes described above are stored on a computer readable medium, such as floppy disks, a CD-ROM, or optical disk. Alternatively, they are supplied to computer system 10 in a read-only memory, or provided in the form of a computer data carrier wave over a network.

It will be apparent to those skilled in the art that various modifications and variations can be made in the disclosed process and product without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of processing interrupts in a computer system comprising:

creating entries in a system database for sources capable of generating interrupts, wherein said entries are in the form of objects;

organizing said objects in the form of an Interrupt Source Tree (IST), wherein each object in said IST comprises an Interrupt Source Entry (ISE);

identifying the source in the system database that generated an interrupt when said interrupt occurs; and processing said interrupt.

2. The method of claim 1 wherein said interrupt comprises:

a first-level realtime native interrupt controlled by a microkernel;

a second-level deferred native interrupt controlled by the microkernel; and a third-level deferred non-native interrupt Java Virtual Machine (JVM).

3. The method of claim 1, wherein said objects comprise references to at least one component of interrupt processing code, said at least one component comprising:

an interrupt handler;

an interrupt enabler;

an interrupt disabler; and an interrupt acknowledger.

4. The method of claim 3, wherein processing said interrupt further comprises:

responding to said interrupt generated from said source by causing a single interrupt dispatcher to execute;

identifying said source to said interrupt dispatcher; and processing said interrupt generated by said source with said interrupt handler corresponding to said source.

5. The method of claim 4 wherein said interrupt dispatcher invokes said interrupt handler.

6. The method of claim 4 wherein said source is a device, said method of identifying said source comprises:

decoding said interrupt via a bus interrupt handler;

locating the child device via said bus interrupt handler; and calling said interrupt handler associated with said child device designated by said bus interrupt handler.

7. The method of claim 3, further comprising synchronizing all three levels of interrupt, said synchronizing comprising:

acquiring a monitor associated with said Interrupt Source Entry before executing said interrupt handler, wherein said interrupt handler will only execute with said monitor; and deferring work from a lower interrupt level to a higher interrupt level, wherein said deferring comprises:
noting said interrupt source object being deferred; and
notifying said interrupt source object when said monitor becomes available, thereby causing the virtual machine to wake-up threads waiting to execute.

8. A system for processing interrupts in a computer comprising:

a processor;

a memory unit coupled to said processor and comprising software configured to process interrupts;

at least one interrupt source having drivers store in said memory unit;

an interrupt dispatcher for responding to interrupts from said interrupt source, said memory unit containing a system database comprising:

a device namespace, wherein said device namespace contains entries in the form of objects for said processor, and said at least one interrupt source; and an interrupt namespace containing an entry for each of said at least one interrupt source, wherein said entry is in the form of an object.

9. The system of claim 8 wherein said software is logically arranged into a platform independent layer and a platform dependent layer, said platform independent layer comprises:

an application program layer for user operations; and a runtime layer comprising a virtual machine and device interfaces, wherein said device interfaces support operations of said at least one interrupt source.

10. The system of claim 9 wherein said platform dependent layer comprises:

a platform interface layer comprising a virtual machine system handler; interrupt classes; Direct Memory Access (DMA) classes; memory classes; and Bus managers;

an Operating System Native Methods layer comprising interrupt, DMA, and method native methods;

a microkernel layer supporting low level hardware functions; and a boot interface layer for loading and initializing said software at power up.

11. The system of claim 8 wherein objects of said interrupt namespace are organized in the form of an Interrupt Source Tree (IST), wherein each object is an Interrupt Source Entry (ISE).

12. The system of claim 8 wherein each entry in the device namespace is cross-referenced with an entry in the interrupt namespace.

13. A computer program product comprising:

a computer readable medium having computer program code embodied therein for processing interrupts, said computer program code configured to:

create entries in a system database for sources capable of generating interrupts, wherein said entries are in the form of objects; and organize said objects in the form of an Interrupt Source Tree (IST), wherein each object in said IST is an Interrupt Source Entry (ISE); and cause a processor to decode interrupts;

determine the source of said interrupts; and process said interrupts.

14. The computer program product of claim 13, wherein said objects comprises references to at least one component of interrupt processing code, said at least one component comprising:

an interrupt handler;

an interrupt enabler;

an interrupt disabler; and an interrupt acknowledger.

15. The computer program product of claim 14, further comprising computer program code configured to cause a processor to:

respond to an interrupt generated by said source by causing an interrupt dispatcher to execute;

identify said source to said interrupt dispatcher; and process said interrupt generated by said source using said interrupt handler corresponding to said source.

16. The computer program product of claim 15, wherein said interrupt handler is invoked by interrupt dispatcher.

17. The computer program product of claim 15, wherein said code configured to cause to computer to identify said source comprises computer program code configured to cause a processor to:

decode said interrupt by a bus interrupt handler;

locate the child device by said bus interrupt handler; and call said interrupt handler associated with said child device designated by said bus interrupt handler.

* * * * *

UNITED STATES PATENT AND TRADEMARK OFFICE
CERTIFICATE OF CORRECTION

PATENT NO. : 6,615,342 B1
APPLICATION NO. : 09/536237
DATED : September 2, 2003
INVENTOR(S) : Boparkikar et al.

It is certified that error appears in the above-identified patent and that said Letters Patent is hereby corrected as shown below:

*In the Claims:*

At column 18, line 23, please amend claim 16 to read:

16. The computer program product of claim 15, wherein said interrupt handler is invoked by said interrupt dispatcher.

Signed and Sealed this

Nineteenth Day of February, 2008

JON W. DUDAS
*Director of the United States Patent and Trademark Office*